Nov. 21, 1950     A. S. VOLPIN     2,530,744

LINE PRESSURE LUBRICATED PLUG VALVE

Filed Oct. 25, 1943     2 Sheets-Sheet 1

INVENTOR.
A. S. VOLPIN
BY Lester B. Clark.
ATTORNEY.

Nov. 21, 1950 A. S. VOLPIN 2,530,744
LINE PRESSURE LUBRICATED PLUG VALVE
Filed Oct. 25, 1943 2 Sheets-Sheet 2

INVENTOR.
A. S. VOLPIN
BY Lester B. Clark.
ATTORNEY.

Patented Nov. 21, 1950

2,530,744

UNITED STATES PATENT OFFICE 2,530,744

LINE PRESSURE LUBRICATED PLUG VALVE

Alexander S. Volpin, Houston, Tex.

Application October 25, 1943, Serial No. 507,551

11 Claims. (Cl. 251—93)

The invention relates to a lubricated plug valve embodying features of advantage in the manufacture and use of such a valve.

It is one of the objects of the invention to provide a lubricated plug valve housing wherein the plug chamber is a cylindrical area of constant diameter which is of a sufficient length to provide a lubricant reservoir in the base below the plug so as to permit the building of the housing with a single boring operation.

Another object of the invention is to provide a lubricated plug valve with a single chamber which acts as a plug valve chamber and a lubricant reservoir.

Another object of the invention is to provide a plug valve support in a cylindrical plug valve chamber by inserting a seat ring in the chamber upon which the plug will support and rotate.

Another object of the invention is to provide a barrier in a plug valve lubricant reservoir so that line pressure leaking into the valve chamber from the high pressure side will exert a pressure thereon to force lubricant to the distribution grooves around the low pressure port.

Another object of the invention is to provide a single lubrication system for the opposite ports of a lubricated plug valve so that either port may be used as the high pressure port wherein a check valve is provided to the distribution grooves so that those grooves on the high pressure side will receive no lubricant due to the high pressure therein and the lubricant will be driven to form a seal about the low pressure port by the leaking of the high pressure into the valve chamber.

Another object of the invention is to provide a distribution groove system in a lubricated plug valve wherein one leg of the distribution grooves is always in contact with the lubricant supply.

Another object of the invention is to provide a distribution groove system for lubricated plug valves wherein the line pressure automatically moves the lubricant so as to force it into the distribution grooves on the low pressure side as soon as the plug begins to turn in its closing action by allowing the pressure to build up against the supply of lubricant during the moving of the valve to closed position.

Another object of the invention is to provide an efficient high pressure lubricated plug valve capable of use on Christmas tree assemblies on oil and gas wells wherein a supply of uncontaminated sealing plastic can be automatically spread as a film on the face of the valve chamber as the plug valve moves to closed position.

Another object of the invention is to provide an efficient high pressure lubricated plug valve capable of use on Christmas tree assemblies on oil and gas wells wherein a large supply of uncontaminated sealing plastic can be automatically fed by line pressure to the downstream sealing surfaces to effect a pressure tight valve over long periods of time free of human servicing.

Another object of the invention is to provide for a single lubricant injection assembly for plug valves which is positioned below the bottom of the valve to protect it against injury or damage.

Other and further objects of the invention will be readily apparent when the following description is considered in connection with the accompanying drawings wherein.

Figure 1:
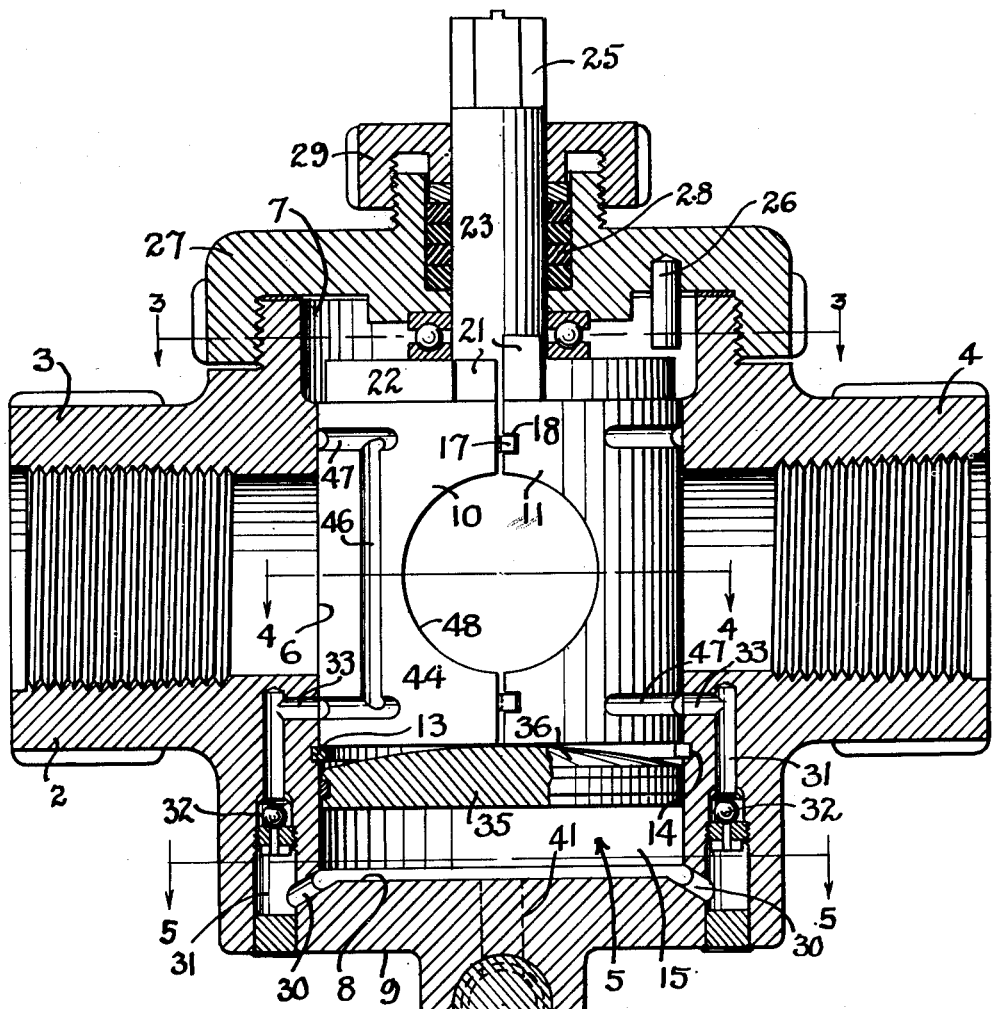
Fig. 1 is a vertical sectional view through the plug valve housing and illustrating the plug in elevation.
Figure 4:
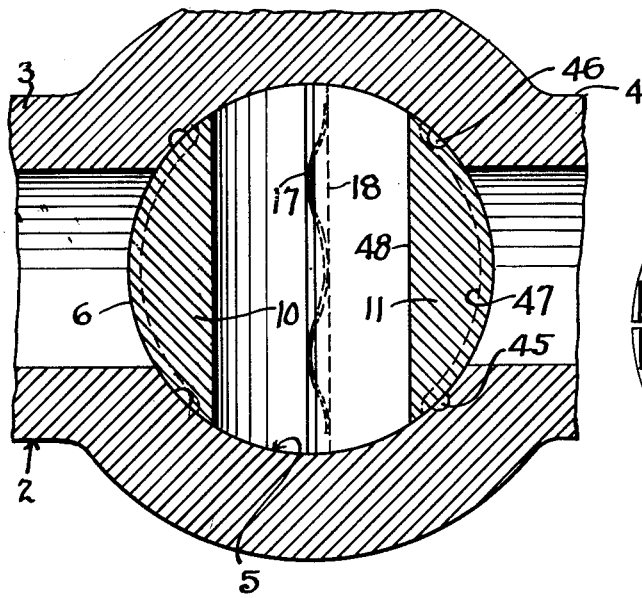
Figure 3:
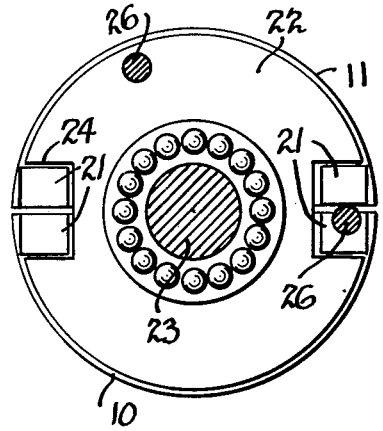
Figure 5:
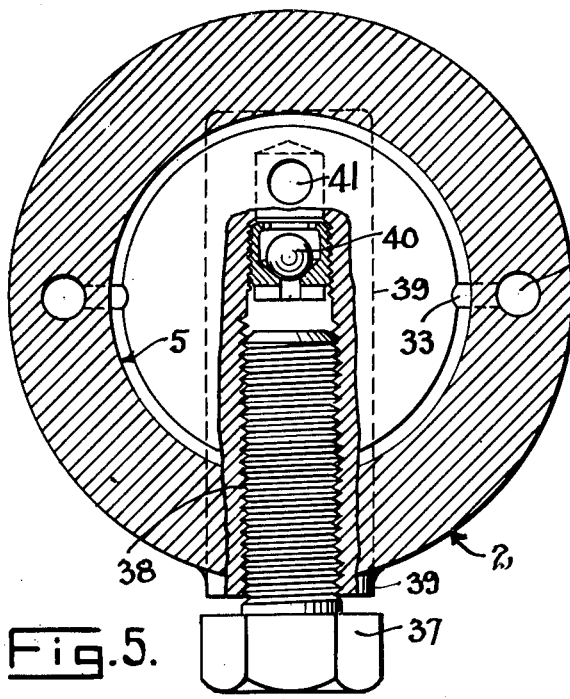

Figs. 3, 4 and 5 are sections taken on the lines 3—3, 4—4 and 5—5 respectively of Fig. 1.

Figure 6:
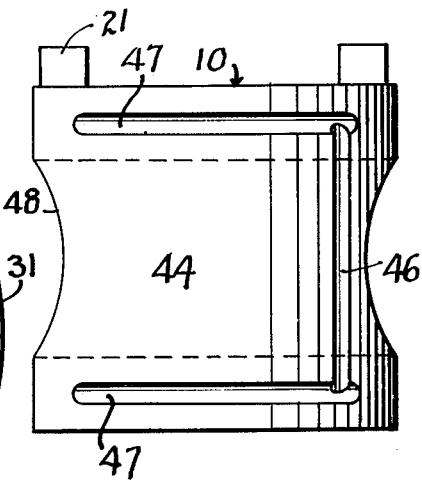

Fig. 6 is the side elevation of one of the plug sections and illustrating the distribution grooves thereon.

In Fig. 1 the valve housing 2 is preferably in the form of a unitary forging or casting which is formed with the end connections 3 and 4 which are shown as threaded to receive the pipe connections, but flanges may be arranged on these ends. The passage through each of the ends to the central plug chamber 5 provide the ports 6 which intersect the periphery of the valve chamber 5.

The top of the valve body is open and is provided with an enlarged area 7 from which the chamber extends. Particular attention is directed to the construction and arrangement of the valve chamber 5 in that it is a cylindrical boring of uniform diameter extending to the bottom 8 closely adjacent the base 9 of the body. A cylindrical bore of this sort can be quickly and economically formed and perfectly ground due to the fact that all of the operations can be performed at one time and it is unnecessary to make two or three grinding operations due at different diameters. It will be noted that this chamber is of considerably greater length than the length of the plug sections 10 and 11 and that the plug sections are spaced from the bottom 8 of the chamber and rest upon a support ring 13 which is in the nature of a spring ring arranged to snap into the recess 14 formed in the periphery of the chamber 5. This ring can be inserted after the cylinder has been formed and then the valve sections 10 and 11 can be deposited thereon so that they are supported on the ring for rotation in opening and closing the valve. This arrangement leaves the lubricant reservoir 15 in the bottom of the chamber so that the chamber is as a matter of fact, a combination plug and lubricant reservoir chamber. The two valve sections are spaced apart by spring members 17 which are arranged in the grooves 18 as seen in Figs. 1 and 4.

In order to turn the valve sections in unison, each valve has a pair of upstanding lugs 21 thereon as seen in Fig. 3. These lugs are arranged to be received within a yoke 22 which is formed integral with the stem 23 and is recessed at 24 so as to fit about the pairs of lugs of the two valve sections. The non-circular portion 25 on the top of the stem may receive a wheel or lever to turn the yoke and thus turn the valve sections. One of the lugs 21 of each section is extended slightly and arranged to engage the stop pin 26 carried by the cap 27 which closes the top of the housing. A suitable packing 28 about the stem 23 is arranged in this cap and is confined by the gland 29.

The lubricant distribution system is best seen in Fig. 1 where the outlets 30 from the reservoir 15 lead into the passages 31 which carry the check valves 32 and lead upwardly through the valve housing body to the outlet 33 in the face of the chamber 5. The check valves 32 prevent flow into the reservoir of any fluid in the valve chamber which might contaminate the lubricant supply.

When the valve is closed the high pressure is exerted on the high pressure side and tends to shift the plug over to the low pressure side against the low pressure port. This allows high pressure to leak into the valve plug chamber and will exert a pressure on the outlet 33 and the check valve 32 on the high pressure side so that the check valve closes off the lubricant on that side, protecting it against contamination and also prevents the waste of any lubricant into the high pressure side. The downstream check valve will open when the pressure in the distribution grooves on that side is lower than the pressure in the valve chamber permitting sealing lubricant to enter the distribution system. The pressure in the valve chamber is approximately that of the high pressure side or line pressure and will be exerted on the upper face of a barrier 35 which is arranged in the lubricant reservoir below the valve plug. This barrier is illustrated as having a rounded upper surface 36 and that it may contact the valve members at the center to limit its upward movement while the curved outer edge avoids contact with the stop ring 13 as the line pressure accumulates in the valve chamber it will exert a pressure downward on this barrier to force the lubricant through the opening 30, the passage 31, the check valve 32 and the outlet 33 only on the low pressure side so that in effect the construction provides high pressure automatic lubrication for the downstream low pressure side of the valve.

In order to introduce the lubricant into the reservoir 15 an injector screw plug 37 is seen in Fig. 5 as being threaded into the chamber 38 in the extension 39 formed on the base 9 of the housing. The check valve 40 prevents any back flow and the inlet opening 41 leads into the lubricant reservoir. Any desired inlet pressure can be applied to the lubricant to introduce it by turning the screw plug 37. The positioning of this plug underneath and below the housing affords it a substantial amount of protection because it has been found that injection plugs placed on the side or extending from the housing have been damaged in many instances.

Figure 2:
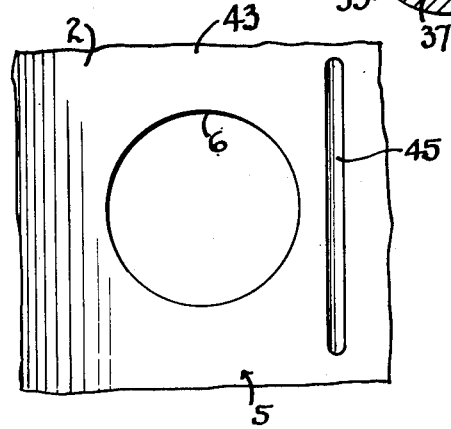
Fig. 2 is a broken elevational view of one of the ports in the housing with the lubricant distribution groove shown adjacent thereto.

The distribution grooves on the face 43 of the chamber and the face 44 of each of the plug sections 10 and 11 are seen in Figs. 2 and 6 respectively. A vertical leg 45 in the form of a groove substantially longer than the diameter of the port 6 is spaced to one side of the port in the periphery 43 as seen in Fig. 2. This groove has no inlet or outlet from or to the lubricant reservoir. In Fig. 6 the surface 44 of the plug section shows a vertical groove 46 and the upper and lower horizontal legs 47, all of which are of greater length than the diameter of the port 6. It seems obvious that with this construction that as the plug is turned to closed position so as to move the opening 48, formed by the two semi-cylindrical grooves on the inside of the plug sections 10 and 11, away from the port 6, that then the periphery 44 gradually moves over the port and the horizontal legs 47 straddle the top and bottom of the port until they finally come into connection with the vertical leg 45 in the face of the chamber. When the valve is in closed position as seen in Fig. 1 the four grooves taken together as an assembly form a complete square about the port and lubricant may flow from the horizontal legs 47 into the vertical leg 45 to give complete lubrication and sealing. This construction is economical because but a single leg 45 must be machined inside of the valve housing.

The horizontal leg 47 as seen in Fig. 1 will be in constant connection with the outlet 33 from the lubricant reservoir even when the valve is in open position. When the valve starts to move to closed position the turning of the plug first begins to restrict the portion of the port which is uncovered and tends to restrict the flow of pressure through the valve and to reduce the pressure in the downstream outlet from the valve. Incidentally upon such an operation the pressure begins to build up in the plug chamber from the high pressure side. This pressure is transmitted between the high pressure side of the upstream valve section and the chamber face and also through the opening between the two valve sections and is applied to the upper face 35 of the barrier so that upon the initiating of the closing movement the pressure begins to build up on the barrier and on the supply of lubricant. As the turning action proceeds, the lubricant will thus be forced into the lower distribution groove 47 through the vertical leg 46 and into the upper leg 47 so as to smear the face of the chamber with lubricant during the closing movement. This pressure gradually builds up during the closing action and when the through passage 48 finally closes the port 6, full line pressure will thereafter be applied to effect a lubricant seal which will prevent any cutting action on the valve and chamber parts due to the presence of abrasives. As the plug moves to full closed position the horizontal legs 47 connect with the vertical leg 45 and the lubricant under pressure thus completely encircles the port 6. This lubricant is applied automatically by the pressure from the high pressure side, no lubricant is wasted and full port lubrication is obtained. When the valve is to be opened the reverse turning of the plug moves the grooves 46 and 47 away from the port, but at no time have any one of the grooves passed over the open port. It has been found in practice that when a lubricant groove passes over an open port that the lubricant is washed or blown out of the groove and waste and foreign matter permitted to enter the groove. In the present construction the downstream plug grooves will always remain filled with lubricant which tends to prevent the entrance of foreign matter.

All of the operations in manufacturing the valve are either straight boring or drilling operations which lend themselves to economy of construction and simplification of operation.

What is claimed is:

1. A rotary plug valve comprising a housing, a flow passage therethru, a plug chamber interrupting said passage to form opposed ports, a two segment plug in said chamber, resilient means normally urging said segments apart and against said ports, means to support said plug above the base of said chamber, a sealing material reservoir in said chamber below said plug, a barrier in said reservoir, a distribution groove enclosing each port when the plug is in closing position, a conduit from below the barrier in said reservoir to each groove, means in the base of said housing to inject material to fill said reservoir and thru said conduits so as to unseat the plug segment on the high pressure port and flush out the groove.

2. A rotary plug valve comprising a housing, a flow passage therethru, a plug chamber interrupting said passage to form opposed ports, a two segment plug in said chamber, resilient means normally urging said segments apart and against said ports, means to support said plug above the base of said chamber, a sealing material reservoir in said chamber below said plug, a barrier in said reservoir, a distribution groove enclosing each port when the plug is in closing position, a conduit from below the barrier in said reservoir to each groove, means in the base of said housing to inject material to fill said reservoir and thru said conduits so as to unseat the plug segment on the high pressure port and flush out the groove, said barrier being movable in response to line pressure to maintain sealing material in the groove about the low pressure port.

3. A lubricated plug valve including a ported housing, a cylindrical plug chamber of constant diameter, a plug seat therein to support the valve plug in spaced relation from the base of the cylinder, a two part ported plug rotatable on said seat, upstream and downstream sides thereon, resilient means urging said parts against the wall of said cylindrical chamber, a lubricant reservoir in the base of said chamber defined by the base of said plug as disposed on said seat, means to inject lubricant into said reservoir, a barrier movable to float on the lubricant in said reservoir, and passages leading from said reservoir to conduct lubricant to the chamber and plug faces whereby the line pressure on said barrier will force lubricant to the downstream face of said plug when said plug is in closed position.

4. A lubricated plug valve including a ported housing, a cylindrical plug chamber of constant diameter, a plug seat therein to support the valve plug in spaced relation from the base of the cylinder, a two part ported plug rotatable on said seat, upstream and downstream sides thereon, resilient means urging said parts against the wall of said cylindrical chamber, a lubricant reservoir in the base of said chamber defined by the base of said plug as disposed on said seat, means to inject lubricant into said reservoir, a barrier movable to float on the lubricant in said reservoir, passages leading from said reservoir to conduct lubricant to the chamber and plug faces whereby the line pressure on said barrier will force lubricant to the downstream face of said plug when said plug is in closed position, and a check valve in each passage to prevent return flow of the lubricant.

5. A lubricated plug valve including a ported housing, a cylindrical plug chamber of constant diameter, a plug seat therein to support the valve plug in spaced relation from the base of the cylinder, a two part ported plug rotatable on said seat, upstream and downstream sides thereon, resilient means urging said parts against the wall of said cylindrical chamber, a lubricant reservoir in the base of said chamber defined by the base of said plug as disposed on said seat, means to inject lubricant into said reservoir, a barrier movable to float on the lubricant in said reservoir, and passages leading from said reservoir to conduct lubricant to the chamber and plug faces whereby the line pressure on said barrier will force lubricant to the downstream face of said plug when said plug is in closed position, said passages being arranged on the chamber and plug faces so that no passage moves over the flow port in the opening or closing of the valve.

6. In a lubricated plug valve a housing, a ported cylindrical combination plug chamber and lubricant reservoir, a plug comprising two separable parts and means to urge the parts against the wall of the chamber whereby leakage from the high pressure side occurs into said plug chamber, said plug being rotatable to open or close the ports, means to support the plug above the bottom of said chamber, a barrier movable in the chamber below the plug, means to introduce lubricant through the housing into said chamber below the plug and below the barrier, the upper surface of said barrier being exposed to pressure leaking into the chamber from the high pressure port so as to move said barrier downwardly in said chamber, and additional means to conduct the lubricant from the said reservoir around said barrier to the chamber and plug faces thereabove in response to the pressure on the barrier.

7. In a lubricated plug valve a housing, a ported cylindrical combination plug chamber and lubricant reservoir, a plug comprising two separable parts and means to urge the parts against the wall of the chamber whereby leakage from the high pressure side occurs into said plug chamber, said plug being rotatable to open or close the ports, means to support the plug above the bottom of said chamber, a barrier movable in the chamber below the plug, means to introduce lubricant through the housing into said chamber below the plug and below the barrier, the upper surface of said barrier being exposed to pressure leaking into the chamber from the high pressure port so as to move said barrier downwardly in said chamber, and additional means to conduct the lubricant from the said reservoir around said barrier to the chamber and plug faces thereabove in response to the pressure on the barrier, said supporting means being insertable in the wall of said chamber.

8. In a lubricated plug valve a housing, a ported cylindrical combination plug chamber and lubricant reservoir, a plug comprising two separable parts and means to urge the parts against the wall of the chamber whereby leakage from the high pressure side occurs into said plug chamber, said plug being rotatable to open or close the ports, means to support the plug above the bottom of said chamber, a barrier movable in the chamber below the plug, means to introduce lubricant through the housing into said chamber below the plug and below the barrier, the upper surface of said barrier being exposed to pressure leaking into the chamber from the high pressure port so as to move said barrier downwardly in said chamber, and additional means to conduct the lubricant from the said reservoir around said barrier to the chamber and plug faces thereabove in response to the pressure on the barrier, said supporting means being insertable in the wall of said chamber, the upper surface of said barrier being rounded so that as the center contacts the plug the edge thereof is spaced below said supporting means.

9. A lubricated plug valve including a housing, a ported plug chamber therein, a ported plug comprising two separable parts and means to urge the parts against the walls of the chamber which allows leakage from the high pressure side thereof into said plug chamber and which plug is rotatable in said chamber, a lubricant reservoir in said chamber below said plug, a barrier movable in said chamber exposed at its upper side to pressure leaking into said chamber from the high pressure side of the valve, passages leading from said reservoir to conduct lubricant from said reservoir to the chamber and plug faces, a hollow boss formed integral with said housing and on the base thereof, a connection therefrom to said chamber, and a lubricant introduction member disposed in said boss and protected by the bottom of said housing.

10. A lubricated plug valve including a housing, a ported plug chamber therein, a ported plug comprising two separable parts and means to urge the parts against the walls of the chamber which allows leakage from the high pressure side thereof into said plug chamber and which plug is rotatable in said chamber, a lubricant reservoir in said chamber below said plug, a barrier movable in said chamber exposed at its upper side to pressure leaking into said chamber from the high pressure side of the valve, passages leading from said reservoir to conduct lubricant from said reservoir to the chamber and plug faces, a set of distribution grooves about the downstream port of said chamber when the plug is in closed position, the grooves of said seat being constructed and arranged to communicate with each other when the valve is in closed position, a passage from said reservoir, one of said grooves of said seat being formed in said plug and enclosing three sides of the chamber port and including a horizontal leg which is arranged to always be in connection with said passage so that as the valve is being closed the pressure being closed off as the valve port moves away from the chamber port builds up on the barrier due to said leakage and forces lubricant through said passage into said enclosing grooves to smear the face of said chamber as the plug closes.

11. A rotary plug valve comprising a housing, a flow passage therethrough, a cylindrical chamber extending into said housing and interrupting said passage to form opposed flow ports, a two part plug in said chamber comprising two separable parts and means to urge the parts against the wall of the chamber whereby leakage from the high pressure side occurs into said plug chamber, a sealing material barrier also movable in said chamber and below said plug, means in said housing to inject sealing material into the base of said chamber against said barrier so that the plug serves to stop the barrier when the base of the chamber is filled, a pair of opposed conduits leading from below said barrier to the face of the plug parts at each port, a distribution groove connected to each conduit and enclosing each port when the plug is in closed position, check means in each conduit to prevent back flow to the reservoir, the high pressure leaking into said chamber being exerted against one plug part to hold it against the downstream or low pressure port and also exerted against said barrier to feed lubricant to the distribution groove formed by that plug part.

ALEXANDER S. VOLPIN.

REFERENCES CITED

The following references are of record in the file of this patent:

UNITED STATES PATENTS

| Number | Name | Date |
| --- | --- | --- |
| 1,048,635 | Allerding | Dec. 31, 1912 |
| 1,720,523 | MacGregor | July 9, 1929 |
| 1,882,287 | Leach | Oct. 11, 1932 |
| 1,937,122 | Leach | Nov. 28, 1933 |
| 2,048,385 | Jacobsen | July 21, 1936 |
| 2,070,000 | Clade | Feb. 9, 1937 |
| 2,146,910 | Nordstrom | Feb. 14, 1939 |
| 2,281,697 | Kerr | May 5, 1942 |
| 2,299,517 | Volpin | Oct. 20, 1942 |
| 2,332,282 | Volpin | Oct. 19, 1943 |

FOREIGN PATENTS

| Number | Country | Date |
| --- | --- | --- |
| 256,098 | Great Britain | Aug. 5, 1926 |
| 374,343 | Italy | Aug. 23, 1939 |
| 494,261 | Germany | Jan. 13, 1937 |
| 577,617 | France | June 7, 1924 |
| 811,993 | France | Jan. 27, 1937 |